United States Patent [19]

Kashiwazaki

[11] Patent Number: 5,345,388
[45] Date of Patent: Sep. 6, 1994

[54] NAVIGATION SYSTEM UTILIZING LOCUS DATA COMPRESSION

[75] Inventor: Takashi Kashiwazaki, Kawagoe, Japan

[73] Assignee: Pioneer Electronic Corporation, Tokyo, Japan

[21] Appl. No.: 922,142

[22] Filed: Jul. 30, 1992

[30] Foreign Application Priority Data

Aug. 6, 1991 [JP] Japan .................................. 3-196498
Aug. 29, 1991 [JP] Japan .................................. 3-218934
Aug. 29, 1991 [JP] Japan .................................. 3-218936

[51] Int. Cl.$^5$ .......................................... G06F 15/50
[52] U.S. Cl. .................................. 364/449; 364/443; 364/444; 340/988; 340/990; 340/995
[58] Field of Search .................... 364/443, 444, 449; 340/988, 990, 995

[56] References Cited

U.S. PATENT DOCUMENTS

| | | | |
|---|---|---|---|
| 4,763,268 | 8/1988 | Itoh et al. | 364/449 |
| 4,774,672 | 9/1988 | Tsunoda et al. | 364/449 |
| 4,897,792 | 1/1990 | Hosoi | 364/449 |
| 4,943,925 | 7/1990 | Moroto et al. | 364/449 |
| 5,117,363 | 5/1992 | Akiyama et al. | 364/449 |

Primary Examiner—Thomas G. Black
Assistant Examiner—Leigh Marie Garbowski
Attorney, Agent, or Firm—Kane, Dalsimer, Sullivan, Kurucz, Levy, Eisele and Richard

[57] ABSTRACT

There is disclosed a navigation system adapted to support driving of a moving body such as an automotive vehicle. This navigation system determines a present position of a moving body in which the navigation system is mounted to display map information corresponding to the position of the moving body and the determined present position, and to store, as locus data, information of a route through which the moving body is advanced to display a movement route in map information. Storing of locus data is carried out by detecting a traveling azimuth to judge a change in the traveling azimuth to thereby compress locus data only to data in a predetermined range before and after the position where the azimuth is changed. Further, coordinate values in a map at the azimuth changed position and traveling azimuth data before and after the azimuth changed position are stored as locus data. In addition, locus data in an instructed collection zone are stored or preserved with respect to a plurality of zones to display a movement route through which the moving body run in the past by locus data in a designated zone thereof.

11 Claims, 15 Drawing Sheets

F I G. 3
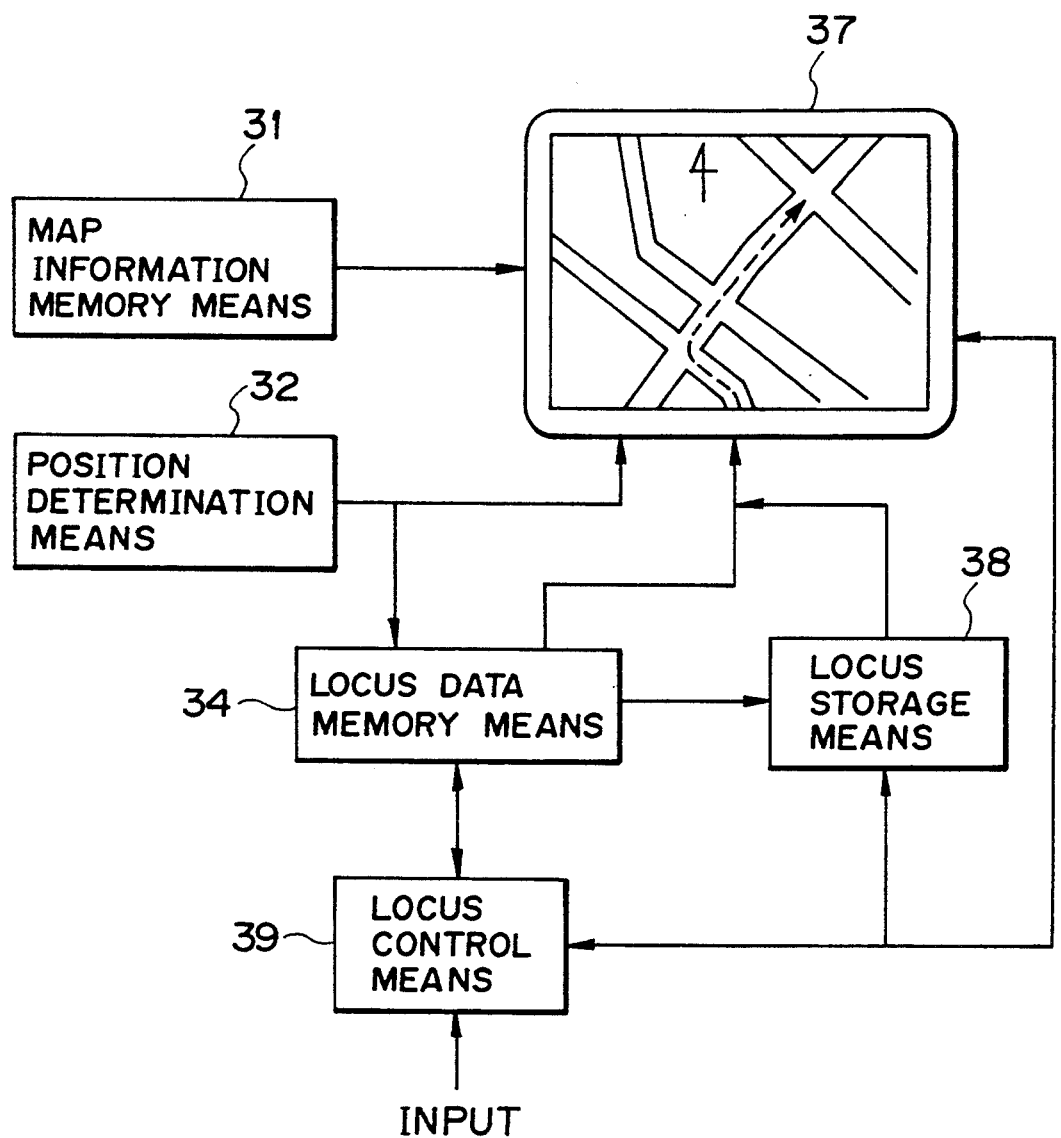

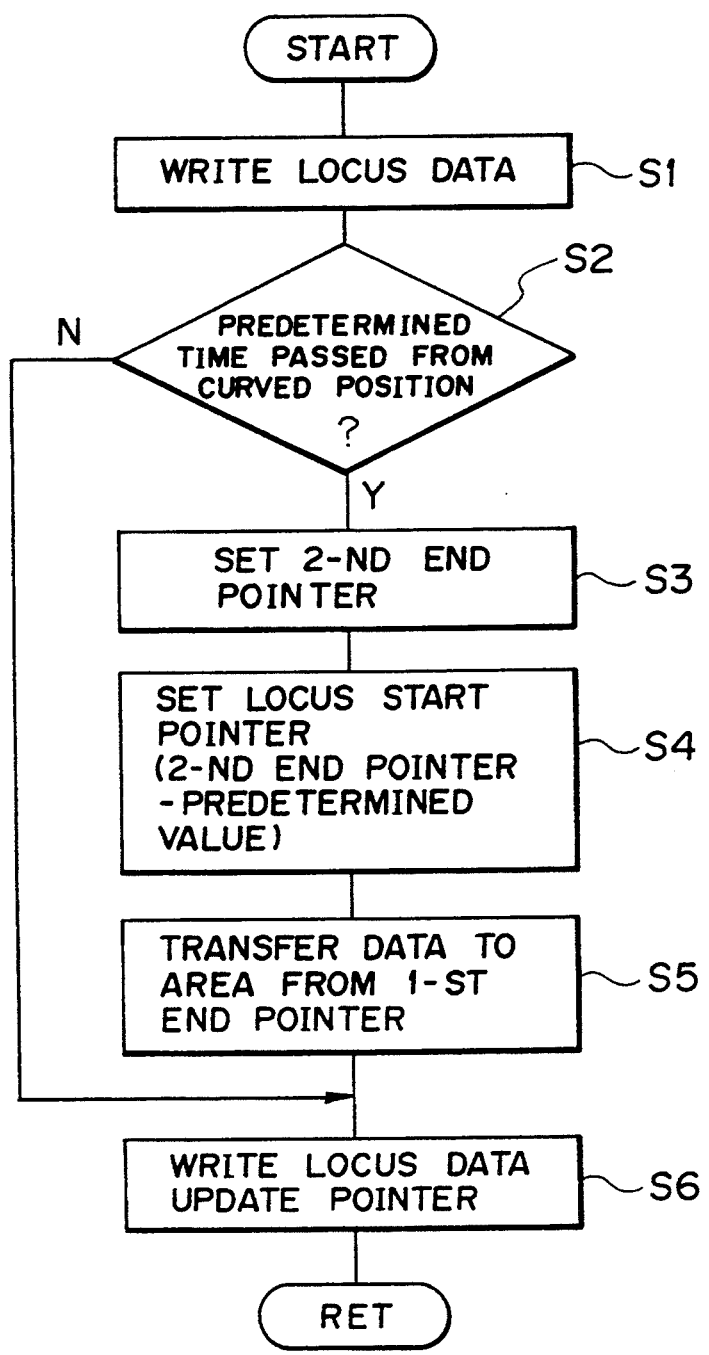

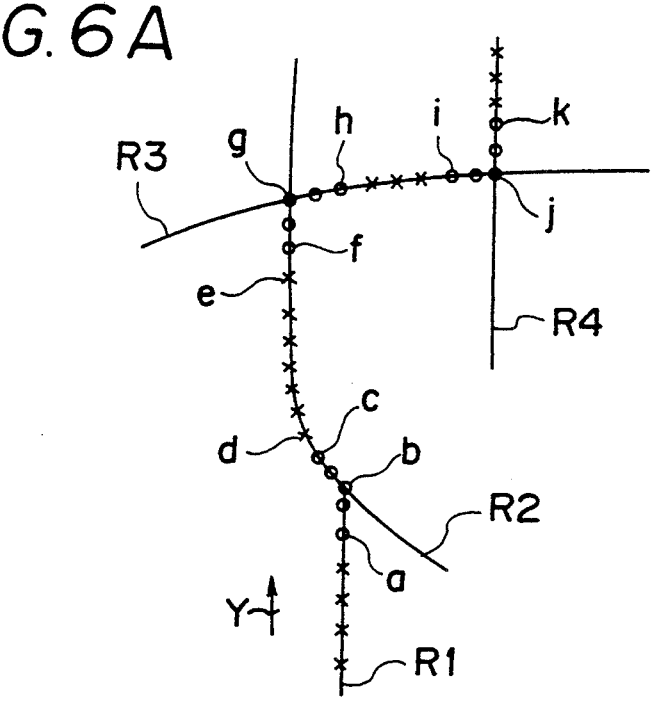

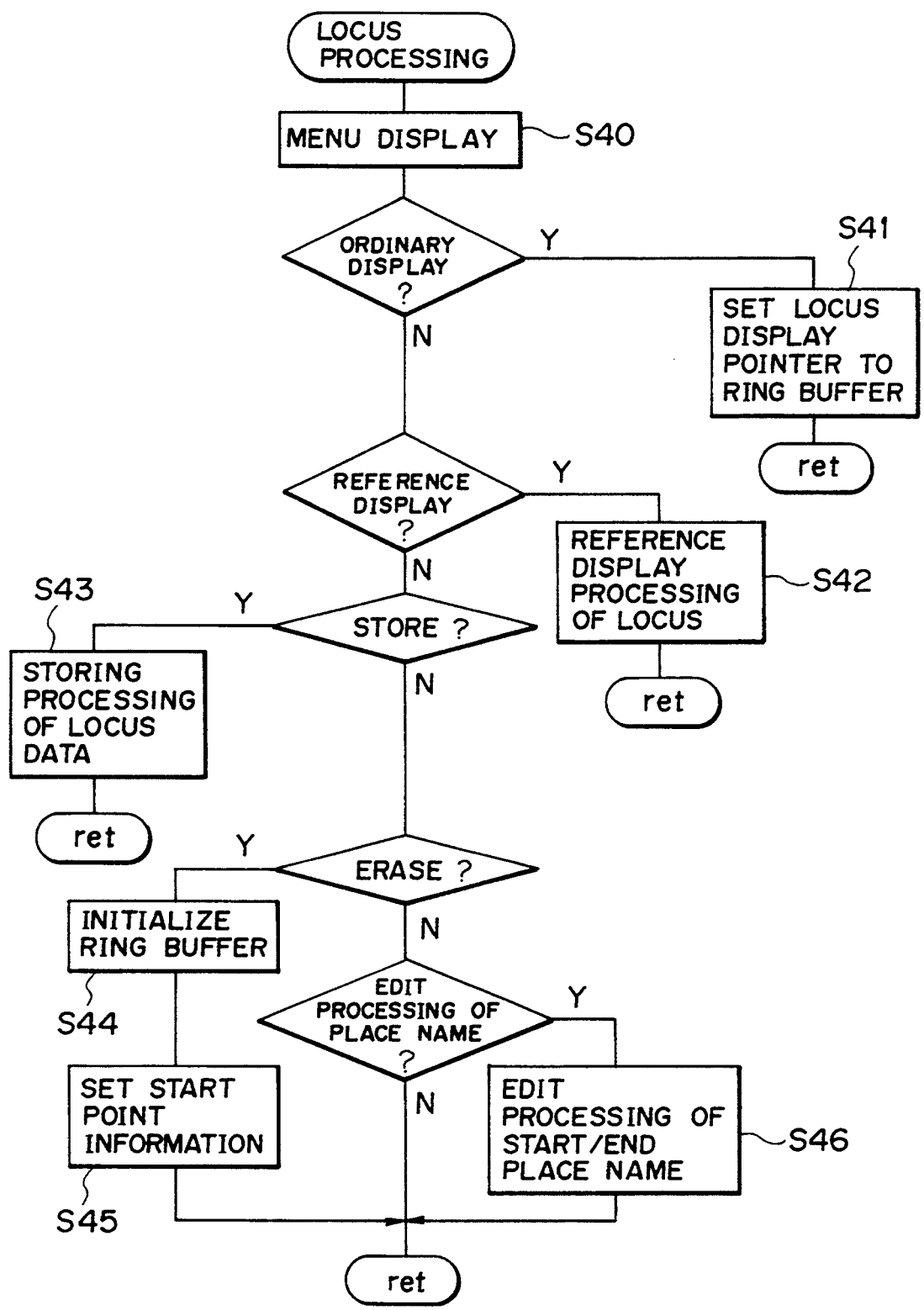

1. '91/5/1 TOKYO —————— KUSATSU
2. '91/8/3 TOKOROZAWA — KARUIZAWA
3. .
4. .
5. .

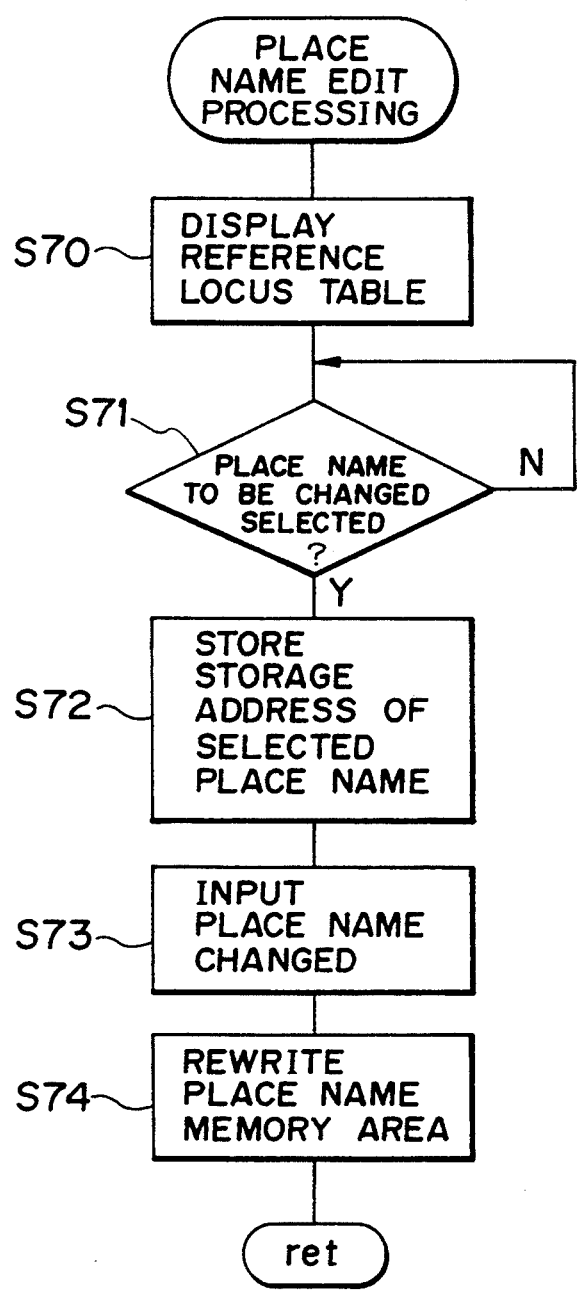

NAVIGATION SYSTEM UTILIZING LOCUS DATA COMPRESSION

BACKGROUND OF THE INVENTION

This invention relates to a navigation system adapted to display map information and present position information in that map information to support or back up driving of a moving body such as an automotive vehicle, etc., and more particularly to a navigation system provided with means adapted to store locus data of a route or path through which a moving body has passed to carry out reference display of that movement route.

In a navigation system adapted to be mounted in a vehicle, such a method is employed to determine a present or current position by use of position determination means such as GPS (Global Positioning System), etc. to display a map including the determined position and display a position of the vehicle itself moving every moment in that displayed map, and to store locus data of a route or path through which the vehicle has passed, thus to carry out display of a present position and display of a locus of the transit route up to the present position.

In this kind of navigation system, the locus data are collected by storing in succession determined present position data every fixed time or every movement of a fixed distance into a ring buffer memory of a fixed memory capacity. At the stage where the quantity of those collected locus data exceeds the memory capacity of the ring buffer memory, new data are overwritten onto the stored locus data in the order from old locus data. Thus, a fixed quantity of locus data are constantly kept collected. Then the display of locus, display of a locus is performed by use of the local data stored in that ring buffer memory. Accordingly, there was adopted a display system such that a locus of a zone or division of a fixed range determined by a memory capacity of the ring buffer memory immediately before a present position of a route or path through which a vehicle has just traveled, is displayed.

In such storage of locus data and display of a locus, in the case of attempting to leave past locus data, it is desirable to store locus data over a movement path as long as possible, thus making it possible to make reference to those locus data. However, in the above described system, when an attempt is made to allow a quantity of locus data which can be stored to be more than that of the existing one, thus to elongate a movement path which can be referenced to, the capacity of the ring buffer memory must be increased. Thus, there result nothing but increased cost and size of the system.

Further, in utilization for an automotive vehicle, etc., movements to various destinations are frequently carried out. There take place many times instances where one goes for a second time to a designation where one has been once. Ordinarily, in the case of movement by an automotive vehicle, etc. to a designation, one cannot readily memorize a route even if one has been only once. For this reason, several times of traveling are required until one can go to a designation without losing his or her way. In addition, in the case of movement to places where one seldom goes, the human memories of the route to the destination may fade or vanish. Therefore, although one has been to that place once, there occurs the necessity of confirming the route to that designation by making reference to a map before one goes to that destination or on his way to that destination.

As stated above, the information as for the route through which an automotive vehicle has traveled once is greatly beneficial in the case where it travels next. In the display of a locus, however, through a locus of a path through which an automotive vehicle has already traveled is displayed only a locus of a zone or division of a fixed range of a path through which an automotive vehicle has traveled to a present position, can be as displayed.

SUMMARY OF THE INVENTION

A first object of this invention is to provide a navigation system adapted to efficiently utilize a memory for storing locus data, thus making it possible to store more loci by lesser quantity of data, and to reference to a longer movement path by the same memory capacity. A second object of this invention is to provide a navigation system adapted to preserve or store, as locus data, movement paths which were run in the past so that they can be readily referenced to when one goes to the same destination for a second time, thus permitting support of driving to be effective.

According to a first aspect of this invention, there is provided a navigation system comprising: a map information memory unit for storing map information to be displayed; a position determination unit for determining a present position of a moving body in which the navigation system is mounted to generate present position data; an azimuth detection unit for detecting a traveling azimuth of the moving body; a locus data memory unit for storing, as locus data, the present position data every a fixed time or every movement of a fixed distance; an azimuth change detection unit adapted for monitoring a traveling azimuth detected by the azimuth detection unit to judge a change in the traveling azimuth, and detecting, as an azimuth changed position, the present position data when the traveling azimuth is changed; a locus data compression unit for compressing the locus data stored in the locus data memory unit by selecting and leaving only locus data in a predetermined range before and after the azimuth changed position; and a display unit adapted to obtain map information corresponding to the present position data from the map information memory unit to display that map information and a present position, and to display a locus in the map information by use of the compressed locus data stored in the locus data memory unit.

In this case, it is preferable that the map information memory unit is a compact disk in which a great quantity of information are stored. Further, it is preferable that the position determination unit is a GPS receiver adapted to receive radiowaves from an artificial satellite to generate present position data. While the azimuth detection unit may be constituted with means adapted for determining a traveling azimuth by present position data generated by the position determination unit, it is preferable that such azimuth detection unit is an azimuth sensor such as a geomagnetic sensor or a gyro, etc.

In accordance with the first aspect of this invention thus constructed, the display unit periodically obtains present position data generated by the position determination unit and also obtains, from the map information memory unit, map information corresponding to the present position data thus obtained, thus to display that map information and a present position. At the same time, the locus data memory unit periodically stores, as locus data, present position data generated by the position determination unit, and the azimuth change detection unit monitors a change of a traveling azimuth of a moving body detected by the azimuth detection unit. The azimuth change detection unit is adapted so that when a traveling azimuth of the moving body varies above a predetermined angle, the azimuth change detection unit judges that the traveling azimuth is changed and detects, by means of the position determination unit, a position where the traveling azimuth is changed. On the other hand, the locus data compression unit selects locus data in a predetermined range before and after the azimuth changed position Judged by the azimuth change detection unit from locus data stored in the locus data memory unit and leaves only selected locus data so as to store thus selected i.e. compressed data in the locus data memory. The display unit obtains that locus data stored to display a locus followed by movement in a map.

For example, in the case of movement on a road such that a moving body such as an automotive vehicle, etc. curves or turns sharply at the intersection, only the position of the intersection and locus data before and after the intersection are stored. On the other hand, display of the locus by the data thus stored is conducted as follows. Namely, by the intersection position and locus data before and after that intersection, an intersection in map information, a road where the moving body has traveled before passing through that intersection, and a road where the moving body has traveled after passing through that intersection, are specified. Thus, a locus thereof can be displayed.

In accordance with this invention, since a compression processing is carried out so as to store locus data in a fixed range before and after the position where the traveling azimuth is changed, e.g., a semiconductor memory is permitted to be used efficiently. Thus, it is possible to reference to a longer movement path by the same memory capacity as in the prior art.

According to a second aspect of this invention, there is provided a navigation system comprising: a map information memory unit for storing map information to be displayed; a position determination unit for determining a present position of a moving body in which the navigation system is mounted to generate present position data; an azimuth detection unit for detecting a traveling azimuth of the moving body; an azimuth change detection unit adapted for monitoring a traveling azimuth detected by the azimuth detection unit to Judge a change in the traveling azimuth and detecting, as an azimuth changed position, the present position data when the traveling azimuth is changed; an azimuth change information memory unit for obtaining the traveling azimuth and the azimuth changed position to generate data of coordinate values in a map display picture at the azimuth changed position and data of at least one of traveling azimuths before and after the moving body passes through the azimuth changed position, and storing them as locus data; and a display unit adapted to obtain map information corresponding to the present position data from the map information memory unit to display that map information and a present position, and to display a locus in the map information by use of the locus data stored in the azimuth change information memory unit.

In this case, it is preferable that the map information memory unit is a compact disk in which a great quantity of information are stored. Further, it is preferable that the position determination unit is a GPS receiver adapted to receive radiowaves from an artificial satellite to generate present position data. While the azimuth determination unit may be constituted with means for determining a traveling azimuth by present position data generated by the position determination unit, it is preferable that the azimuth detection unit is an azimuth sensor such as a geomagnetic sensor or gyro, etc. In addition, it is preferable that the display unit displays, in displaying a locus in the map information, a mark indicating an azimuth changed point at a coordinate position in the map at the azimuth changed position.

In accordance with the second aspect of this invention thus constructed, an approach is employed to monitor a traveling azimuth of a moving body to judge a change in the traveling azimuth, e.g., curves of right or left turn at the intersection, etc. of a road to detect that changed position, and to generate data of the featuring point in the map at that changed position, thus to store the generated data of the featuring point as locus data.

Namely, the azimuth change detection unit monitors a change in the traveling azimuth of a moving body detected by the azimuth detection unit. As a result, when the traveling azimuth of the moving body varies above a predetermined angle, the azimuth change detection unit judges that the traveling azimuth is changed, thus to obtain, by data from position determination unit, a position where the traveling azimuth is changed. On the other hand, the azimuth change information memory unit obtains, periodically, for example, a traveling azimuth detected by the azimuth detection unit to store it, and to obtain a traveling azimuth changed position detected by the azimuth change detection unit to select a traveling azimuth immediately before or after that changed position, or both traveling azimuths before and after that changed position to assume data of that traveling azimuth as azimuth changed information. Further, an approach is employed to obtain, from displayed map information, coordinate values in the map at the traveling azimuth changed position to assume data of that coordinate values as azimuth changed information and store, as locus data, at least coordinate values and traveling azimuth data as azimuth changed information. On the other hand, the display unit displays map information and a present position, and obtains locus data from the azimuth change information memory unit, thus to display a locus followed by movement in the map.

For example, in the case where a moving body curves or turns sharply at the intersection in movement on a road, coordinate values in the map of the intersection and a traveling azimuth at the time of incoming of that intersection or a traveling azimuth at the time of escape therefrom are stored. On the other hand, in reproduction of a locus by the stored data, the intersection in the map information, a road until the moving body reaches that intersection, and a road on which the moving body has advanced after having passed through that intersection are specified by the intersection position and traveling azimuth data before and after the intersection position. Thus, the locus is reproduced.

In accordance with second aspect of the this invention, since an approach is employed to store only coordinate values at the traveling azimuth changed position and traveling azimuth values before and after that changed position, thus permitting locus information to be stored by less quantity of data, e.g., a semiconductor memory is efficiently used. Thus, it is possible to store and reference to data of a longer movement path by the same memory capacity as in the prior art. In addition, since an approach is employed to store the traveling azimuth changed position by coordinate values in displayed map information, it becomes easy to allow the traveling azimuth changed position in the displayed map to be displayed effectively from a visual point of view, thus advantageously improving support of driving.

According to a third aspect of this invention, there is provided a navigation system comprising: a map information memory unit for storing map information to be displayed; a position determination unit for determining a present position of a moving body in which the navigation system is mounted to generate present position data; a locus data memory unit for collecting and storing, as locus data, the present position data every a fixed time or every movement of a fixed distance; a locus storage unit for storing or preserving the collected locus data in a zone sectioned by a collection start point and a collection end point of the locus data with respect to a single zone or a plurality of zones; a locus control unit, which is operated according to an instruction from the external for storing or preserving, into the locus storage unit, locus data collected in the locus data memory unit together with information of the collection zone including the collection start point and the collection end point of that locus data, and for controlling the preserved locus data; and a display unit adapted to obtain map information corresponding to the present position data from the map information memory unit to display that map information and a present position, and to select locus data in a zone instructed by the locus control means out of the locus data stored in the locus data memory unit or the locus storage unit, thus to display a locus corresponding to the selected locus data in the map information.

In this case, the navigation system may be provided with the previously described azimuth detection unit, the azimuth change detection unit, and the locus data compression unit to compress locus data, and store compressed data, so that the distance of a locus in a single zone to be stored or preserved can be made longer. Further, the navigation system may be provided with the previously described azimuth detection unit, the azimuth change detection unit, and azimuth change information memory unit in place of the locus data memory unit to permit a locus to be stored by less quantity of data, so that the distance of a locus in a single zone to be stored or preserved can be made longer. In these cases, it is preferable that the map information memory unit is a compact disk in which a great quantity of information are stored. Further, it is preferable that the position determination unit is a GPS receiver adapted to receive radiowaves from an artificial satellite to generate present position data. While the azimuth detection unit may be constituted with means for determining a traveling azimuth by use of the present position data generated by the position determination unit, it is preferable that the azimuth detection unit is an azimuth sensor such as a geomagnetic sensor or a gyro, etc. In addition, it is preferable that the locus storage unit is an external memory unit having a large memory capacity, particularly a compact and detachable IC card.

In accordance with the third aspect of this invention thus constructed, locus data stored in the locus data memory unit is utilized for displaying a movement path in the map information by the display unit. When locus data are collected and an instruction of collection end is externally inputted to the locus control unit, the locus control unit stores or preserves, into the locus storage unit, names of places, e.g., a collection start point and a collection end point, etc. as locus data in the collected zone and information as for that zone. Further, the locus control unit generates a locus managing table to manage locus data stored or preserved in the locus storage unit so as to allow the locus display unit to display locus data in a zone instructed from the external.

Thus, locus data in the zone where a moving body has traveled in the past can be stored or preserved. Accordingly, when running at the same place for a second time, it is possible to specify locus data in the zone stored or preserved to reference to and display the past movement path on the necessary occasions. Thus, driving of the moving body can be effectively supported.

BRIEF DESCRIPTION OF THE DRAWINGS

FIG. 3 is a block diagram showing the principle of a third invention.

FIG. 5 is a flowchart of the locus data compression processing in the first embodiment.

FIGS. 6A, 6B(1) and 6B(2) are explanatory views of storage of locus data and the compression processing thereof in the first embodiment.

FIG. 11 is a flowchart of the locus control processing in the third embodiment.

FIG. 15 is a flowchart showing a place name editing processing in the third embodiment.

DETAILED DESCRIPTION OF THE PREFERRED EMBODIMENTS

Figure 1:
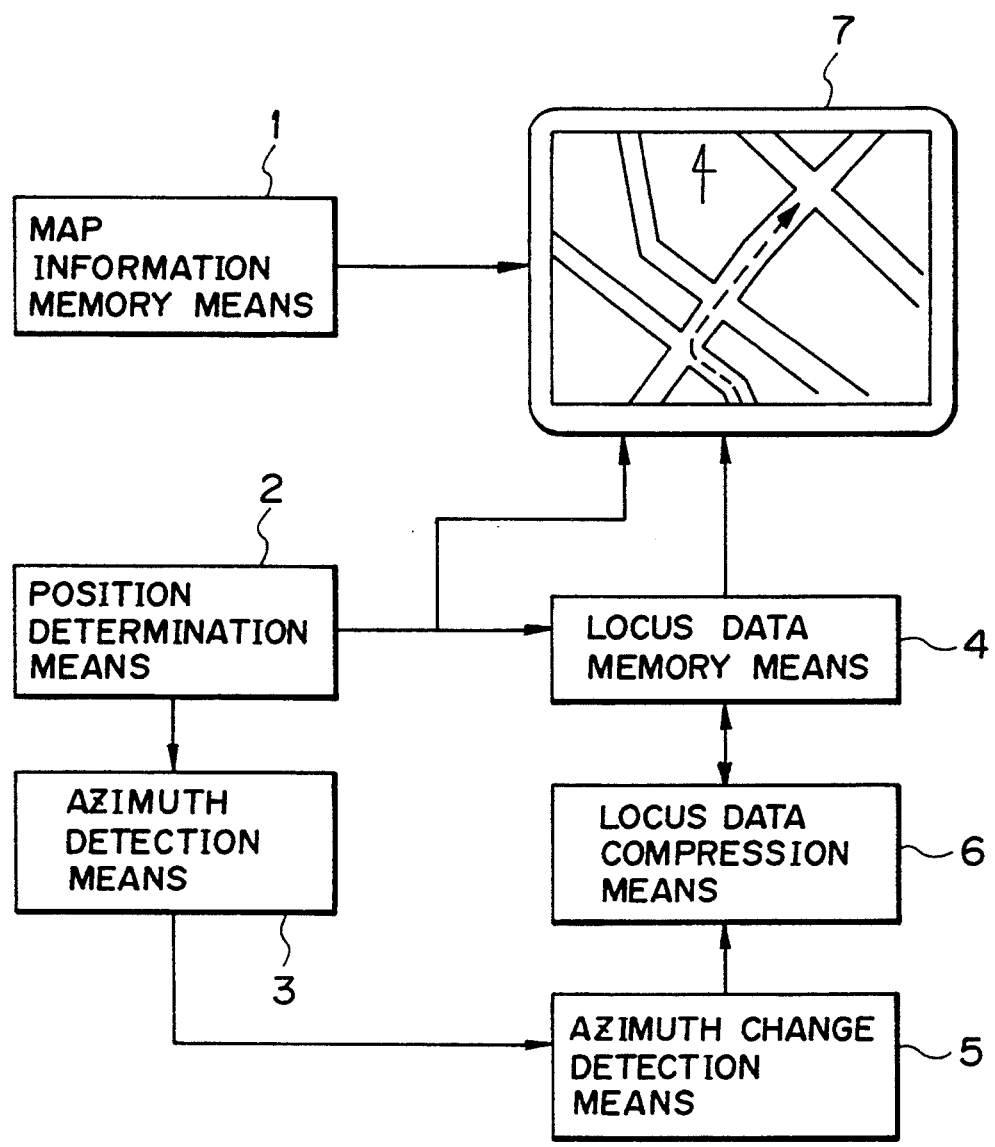
FIG. 1 is a block diagram showing the principle of a first invention.
Figure 2:
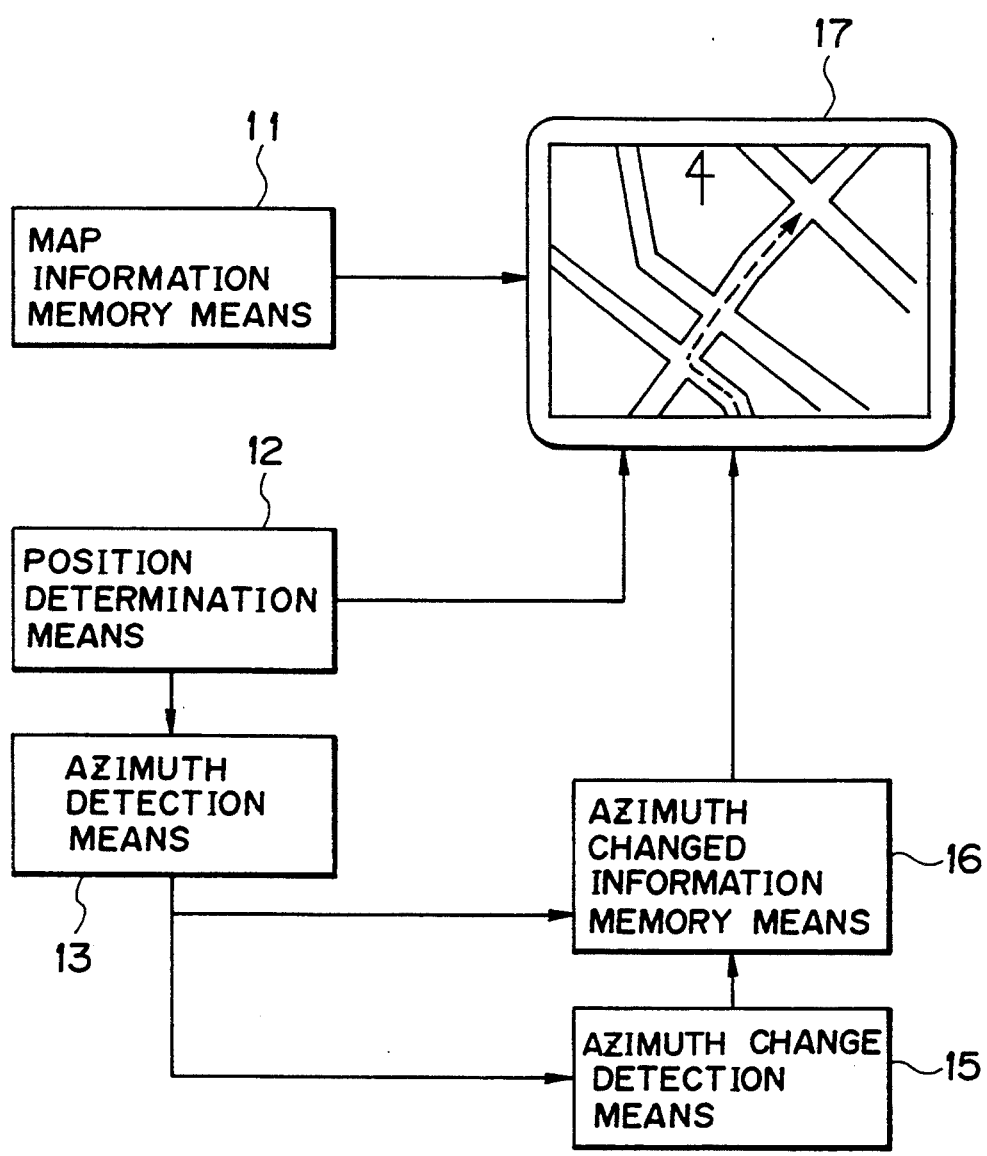
FIG. 2 is a block diagram showing the principle of a second invention.

Prior to the description of the embodiments, the principle of this invention will be first describe with reference to FIGS. 1 to 3.

The principle of a first invention is shown, in a block form in FIG. 1.

As shown in this figure, a navigation system of the first invention is provided with: map information memory means 1 for storing map information to be displayed, position determination means 2 for determining a present position of a moving body itself in which the navigation system is mounted to generate present position data, azimuth detection means 3 for detecting a traveling azimuth of the moving body, locus data memory means 4 for storing, as locus data, the present position data every a fixed time or every movement of a fixed distance, azimuth change detection means 5 adapted to monitor a traveling azimuth detected by the azimuth detection means 3 to judge that change, thus to detect, as an azimuth changed position, the present position data when the traveling azimuth is changed, locus data compression means 6 for implementing data compression to locus data stored in the locus data memory means 4 leaving locus data in a predetermined range before and after the azimuth changed position, and display means 7 adapted to obtain map information corresponding to the present position data from the map information memory means 1 to display that map information and a present position, and to display a locus in the map information by locus data stored in the locus data memory means 4. In the above configuration, the display means 7 periodically obtains present position data generated by the position determination means 2 to obtain, from the map information memory means 1, map information corresponding to the present position data thus obtained, thus to display that map information and a mark of the present position. At the same time, the locus data memory means 4 periodically stores, as locus data, present position data generated by the position determination means 2, and the azimuth change detection means 5 monitors a change in the traveling azimuth of a moving body detected by the azimuth detection means 3. The azimuth change detection means 5 is adapted so that when a traveling azimuth of a moving body varies above a predetermined angle, the azimuth change detection means 5 judges that the traveling azimuth is changed to detect, by the present position data of the position determination means 2, a position where the traveling azimuth is changed. On the other hand, the locus data compression means 6 selects locus data in a predetermined range before and after the azimuth changed position judged by the azimuth change detection means 5 from locus data stored by the locus data memory means 4 to compress data so that only selected locus data is left to be stored as compressed data in the locus data memory means 4. The display means 7 obtains that locus data stored to display a locus followed by movement in the map.

The principle of the second invention is shown, in a block form, in FIG. 2.

As shown in this figure, a navigation system of the second invention is provided with: map information memory means 11 for storing map information to be displayed, position determination means 12 for determining a present position of a moving body in which the navigation system is mounted to generate present position data, azimuth detection means 13 for detecting a traveling azimuth of the moving body, azimuth change detection means 15 adapted for monitoring a traveling azimuth detected by the azimuth detection means 13 to judge a change in the traveling azimuth to detect, as an azimuth changed position, the present position data when the traveling azimuth is changed, azimuth changed information memory means 16 adapted to obtain the traveling azimuth and the azimuth changed position to generate at least data of coordinate values in a map display picture at the azimuth changed position and either a traveling azimuth before the moving body passes through the azimuth changed position or a traveling azimuth after it passes through the azimuth changed position, or both traveling azimuth values before and after the moving body passes through the azimuth changed position, thus to store them as locus data, and display means 17 adapted to obtain map information corresponding to the present position data from the map information memory means 11 to display that map information and a present position, and to display a locus in the map information by locus data stored in the azimuth changed information memory means.

In the second invention thus constructed, an approach is employed to monitor a traveling azimuth of a moving body to judge a change in the traveling azimuth, e.g., curves of right or left turn at the intersection, etc. of a road to detect that changed position, and to generate data of the featuring point in the map at that changed position, thus to store the generated data of the featuring point as locus data.

Namely, the azimuth change detection means 15 monitors a change in the traveling azimuth of a moving body detected by the azimuth detection means 13. As a result, when the traveling azimuth of the moving body varies above a predetermined angle, the azimuth change detection means 15 judges that the traveling azimuth is changed, thus to obtain, by data from the position determination means 12, a position where the traveling azimuth is changed. On the other hand, the azimuth changed information memory means 16 obtains, periodically, for example, a traveling azimuth detected by the azimuth detection means 13 to store it, and to obtain the traveling azimuth changed position detected at the azimuth change detection means 15 to select a traveling azimuth immediately before or after that changed position, or both traveling azimuth values before and after that changed position to assume data of that traveling azimuth as azimuth changed information. Further, an approach is employed to obtain, from displayed map information, coordinate values in the map at the traveling azimuth changed position to assume data of that coordinate values as azimuth changed information to store, as locus data, at least coordinate values and traveling azimuth data serving as azimuth changed information. On the other hand, the display means 17 displays map information and a present position, and obtains locus data from the azimuth changed information memory means 16, thus to display a locus followed by movement in the map.

The principle of the third invention is shown, in a block form, in FIG. 3.

As shown in this figure, a navigation system of the third invention is provided with: map information memory means 31 for storing map information to be displayed, position determination means 32 for determining a present position of a moving body in which the navigation system is mounted to generate present position data, locus data memory means 34 for collecting and storing, as locus data, the present position data every a fixed time or every movement of a fixed distance, locus storage means 38 for storing or preserving the collected locus data in a zone sectioned by a collection start point and a collection end point of the locus data with respect to a single zone or a plurality of zones, locus control means 39 responsive to an instruction from the external to store or preserve, into the locus storage means 38, locus data collected in the locus data memory means 34 together with information of the collection zone including the collection start point and the collection end point of that locus data, thus to control the stored or preserved locus data, and display means 37 adapted to obtain map information corresponding to the present position data from the map information memory means 31 to display that map information and a present position, and to select locus data in a zone instructed from the external of the locus data stored in the locus data memory means 34 or the locus storage means 38, thus to display a locus corresponding to the selected locus data in the map information.

In the above-mentioned configuration, locus data stored in the locus data memory means 34 is utilized for displaying a movement path in the map information by the display means 37. When locus data are collected and an instruction of collection end is inputted from the external to the locus control means 39, the locus control means 39 stores or preserves the collected locus data in the zone, and respective names of places, e.g., a collection start point and a collection end point, etc. as information in that zone. Further, the locus control means 39 generates a locus control table to control locus data stored or preserved in the locus storage means 38 to allow the locus display means 37 to display locus data in a zone instructed from the external.

Embodiments of this invention will be described in detail.

FIRST EMBODIMENT

Figure 4:
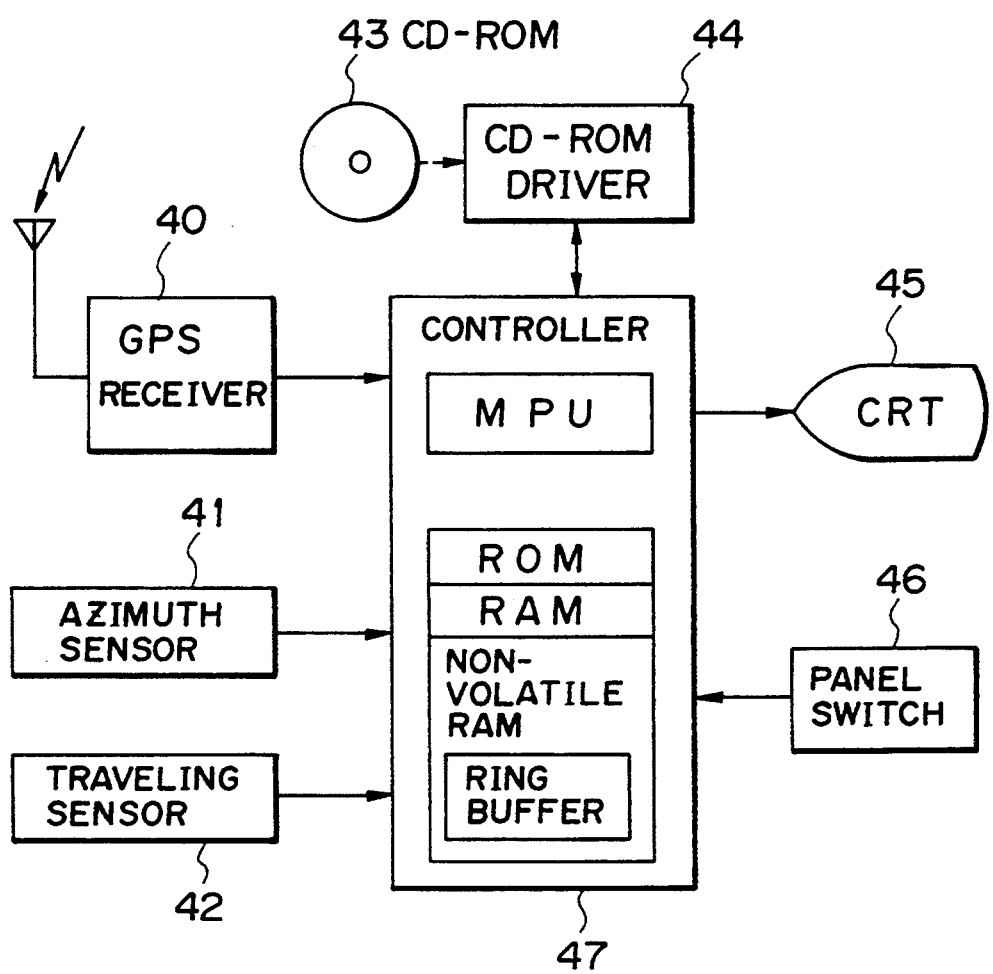
FIG. 4 is a block diagram showing a navigation system adapted to be mounted in a vehicle which is a first embodiment of the present invention.

The configuration of a navigation system adapted to be mounted in a vehicle which is an embodiment of the first invention is shown in a block form in FIG. 4.

The navigation system shown in this figure comprises a GPS receiver 40 adapted to receive radiowaves for position determination to determine a present position of the vehicle, an azimuth sensor 41 serving as the azimuth detection means for detecting a traveling azimuth of the vehicle by a geomagnetic sensor or a gyro, a traveling or running sensor 42 for detecting the traveling or running state such as a vehicle speed, or a traveling or running distance, etc., a CD-ROM 43 serves as a data base of map information, a CD-ROM driver 44 adapted to read out information from the CD-ROM 43, a CRT (Cathode Ray Tube) 45 for displaying map and other information, a panel switch 46 provided with operation input switches, and a controller 47 for controlling the entirety of the system.

The GPS receiver 40 is position determination means adapted to generate present position data indicating latitude and longitude by a GPS (Global Positioning System) adapted to receive radiowaves from an artificial satellite. Further, the azimuth sensor 41 and the traveling sensor 42 constitute position determination means of the independent type. From these detection signals, present position data indicating latitude and longitude are calculated by calculation means constructed in the controller 47. These position determination means are properly used or are jointly used depending upon circumstances, and are thus constituted so as to improve the accuracy of a present position to be determined. The controller 47 includes a MPU (Microprocessor Unit) for carrying out data processing and other controls, a ROM (Read Only Memory) and a RAM (Random Access Memory) adapted to store therein programs for MPU and other data, a battery backed up non-volatile RAM, and an interface, etc. At the non-volatile RAM, a ring buffer is set as a memory area of locus data.

In the above configuration, the controller 47 obtains present position data by the GPS receiver 40, or the azimuth sensor 41 and the traveling sensor 42 to read out map information corresponding to the present position from the CD-ROM 43 through the CD-ROM driver 44 to display the map information thus read out and a mark of the present position on the CRT 45. Further, the controller 47 periodically obtains present position data to carry out updating relating to display of the present position mark and the map of the present place map followed by movement of the position of the vehicle. In addition, various information except for map are read out by an input instruction from the panel switch 46, and are displayed on the CRT 45.

Further, the controller 47 obtains present position data conjectured from data from the GPS receiver 40 and the traveling sensor 42 every a fixed time as the locus data memory means when the vehicle is running to store in sequence those present position data into the ring buffer provided in the non-volatile RAM as locus data. At the same time, the controller 47 inputs, as the azimuth change detections means, a detection signal of the geomagnetic sensor 41 every a fixed time to monitor a change in the traveling azimuth. In this monitoring, when a change of the traveling azimuth is above a predetermined angle, the controller 47 judges that the vehicle has changed its advancing or traveling azimuth, i.e., has curved to conjecture present position data at that time from data from the GPS receiver 40 and the traveling sensor 42 to store, as locus data, that present position data into the non-volatile RAM.

The flowchart showing the processing that the controller 47 carries out as the locus data compression means after it judges a change of the traveling azimuth is shown in FIG. 5. An explanatory view of data compression is shown in FIG. 6. FIG. 6A shows a route diagram in the case where a vehicle moves from the lower part of the figure to the upper direction Y along the route where roads R1, R2, R3, R4 are indicated by "Ox". FIG. 6B is an explanatory view of the storage state into the ring buffer RB of locus data in the movement shown in FIG. 6A. The storage state prior to data compression is shown at 1 in FIG. 6B, and the storage state after undergoing data compression is shown at 2 in FIG. 6B.

The processing as the locus data memory means and the locus data compression means of the controller 47 will now be described with reference to FIGS. 5 and 6. In FIG. 6, in the movement from the road R1 to the road R2, the controller 47 judges that a vehicle curves or turns sharply at the point b to store transit position data of the position a~b~c before and after the point b into memory areas designated by addresses 0 to 4, and to set the address 5 at a first end point EP1. Subsequently, in movement on the road R2, the controller 47 writes locus data at respective transit points of d~e, f in order into the ring buffer RB. Then, the controller 47 judges that the vehicle has curved, i.e., turned sharply at the intersection g of the roads R1 and R2. The processing after it is judged that the vehicle has curved will now be described in detail with referring to FIG. 5.

Steps S1, S2: After locus data is written into the ring buffer RB, whether or not a predetermined time has passed after the vehicle passes through the intersection where it has curved is examined. Namely, whether or not a predetermined number of locus data are written after the vehicle has curved is examined. As a result, if the predetermined number of locus data have not yet written, the processing procedure branches to step S6 to update the write pointer to stand by writing of the next locus data.

Step S3: When the write operation of the predetermined number of locus data is completed, the final write address of the ring buffer RB is set to the second end pointer EP2. This processing will be described below with reference to FIG. 6. After locus data up to the point h after a predetermined has passed from the intersection g where the vehicle has turned right are stored into memory areas indicated by addresses up to the address 16 of the ring buffer RB, the final address 16 is set to the second end pointer EP2.

Step S4: Then, locus start pointer SP is set. A memory address of locus data at the point where the second pointer EP2 is minus a predetermined value is set to the locus start pointer SP. Namely, as shown in FIG. 6, memory address 12 at the point f is set so that the same number of locus data as that of locus data from the intersection g to the point h can be ensured before the intersection g.

Step S5: Data from the locus start point SP to the second end pointer EP1 are transferred into the area of the ring buffer RB from the end point EP1 to carry out data compression. FIG. 6B(1) shows the state where data compression is not yet carried out, wherein data from the address 12 to the address 17 are transferred into the area of the address 5 and addresses succeeding thereto. On the contrary, FIG. 6B(2) shows the state where data compression has been carried out. Namely, as shown in this figure, locus data f~h before and after the point g where the vehicle curved next are stored into a memory area immediately after the memory areas of locus data a~c before and after the point g where the vehicle curved last time. In this instance, only locus data (mark O) before and after the point where the vehicle curved is left, whereas locus data d~e (mark x) therebetween are erased. After transferred, the address 10 of the area where data is to be stored next is set to the first end pointer. Thus, locus data are similarly collected from the next curve point j to the point k where a predetermined time has passed, and only locus data i~k before and after the curve point j are compressed and left.

As stated above, this embodiment adopts an approach to judge whether or not a vehicle changes its traveling azimuth to carry out, when the vehicle is judged to change its traveling direction, data compression so as to store only a fixed number of locus data before and after the point where the vehicle changes its traveling azimuth. Thus, it becomes unnecessary to store locus data of most of a route between intersections where the vehicle changes its traveling azimuth. For this reason, it is possible to store a longer locus by the same capacity of the ring buffer. When reference-displaying a movement route by using the stored locus data, an intersection where the vehicle curved and a road between intersections can be specified by locus data before and after intersections. For this reason, it is possible to reproduce with ease the route through which the vehicle moves.

It is to be noted that while, in the above-described embodiment, azimuth is detected by the geomagnetic sensor as azimuth detection means, there may be adopted a method of detecting a traveling azimuth by a change in present position data generated by GPS receiver as the position determination means.

Further, while the compression processing of locus data is carried out every time a curve position is detected, this invention is not limited to such an implementation. For example, a method may be employed to store locus data and the position where the traveling azimuth is changed into the ring buffer until the data quantity becomes equal to the full capacity thereof to collectively carry out compression processing thereof when they are stored when the quantity of those data has reached the full memory capacity of the ring buffer. Alternatively, compression processing may be carried out at the time when locus data is transferred to another medium, or after it is transferred thereto.

A second embodiment will now be described.

SECOND EMBODIMENT

The second embodiment described below is directed to a navigation system adapted to be mounted in a vehicle which is an embodiment of the second invention. The configuration of the navigation system of the second embodiment is the same as the configuration of the first embodiment which has been already described with reference to FIG. 4, and its explanation is omitted here.

In the navigation system of this embodiment, the controller 47 obtains locus data during running to carry out a processing to store it into the non-volatile RAM. The processing for storing locus data is carried out by storing present position data generated by the position determination means such as GPS receiver 20, etc. into a ring buffer of a small capacity every fixed time or every fixed distance, and by detecting the position where the traveling azimuth is changed to generate information of that changed position to store it into the ring buffer.

In the processing for generating information of the position where the traveling azimuth is changed, the controller 47 first inputs, as the azimuth change detection means when a vehicle is running, a detection signal of the azimuth sensor 41 every a fixed time or every movement of a fixed distance to monitor a change of the traveling azimuth. When the traveling azimuth is changed by more than a predetermined angle in that monitoring, the controller 47 judges that the vehicle changes its traveling azimuth, i.e., curves or turns sharply at the intersection, etc. to obtain present position data at the time of judgment from the GPS receiver 40 or the azimuth sensor 41 and the running sensor 42 to store that data into the non-volatile RAM as locus data of the position where the traveling azimuth is changed. It is to be noted that a predetermined angle in the monitoring interval and judgment is set so that right turn or left turn at the intersection can be judged as a change in the traveling azimuth.

Further, the controller 47 carries out a processing as the azimuth changed information memory means. In the processing as the azimuth changed information memory means, the controller 47 generates coordinate values in a map at the position where the traveling azimuth is changed, which is detected by monitoring the traveling azimuth, and data of a traveling azimuth before the vehicle is passed through the position where the traveling azimuth is changed, and a traveling azimuth after the vehicle passes through that position, thus to store them as information locus data of the position where the traveling azimuth is changed.

Figure 7A:
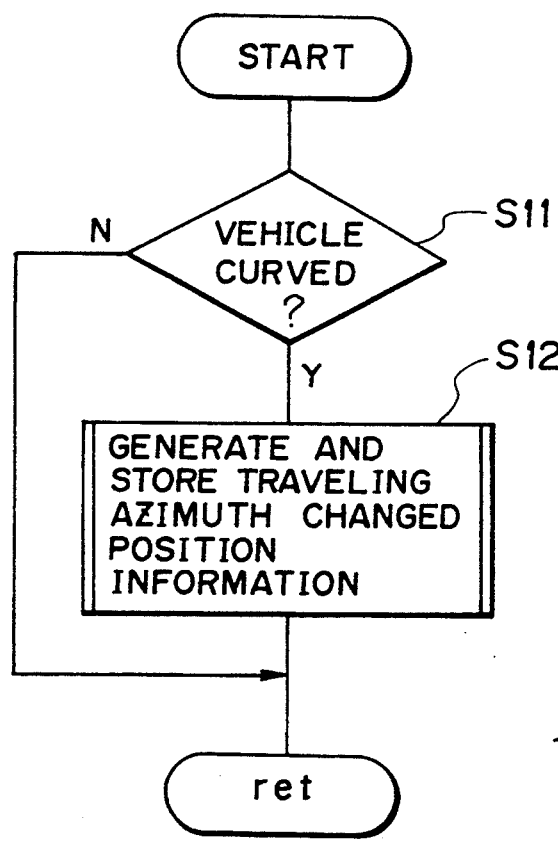
FIGS. 7A and 7B are explanatory views of the processing for generating and storing information of the traveling azimuth changed positioned in a second embodiment of the present invention.
Figure 7B:
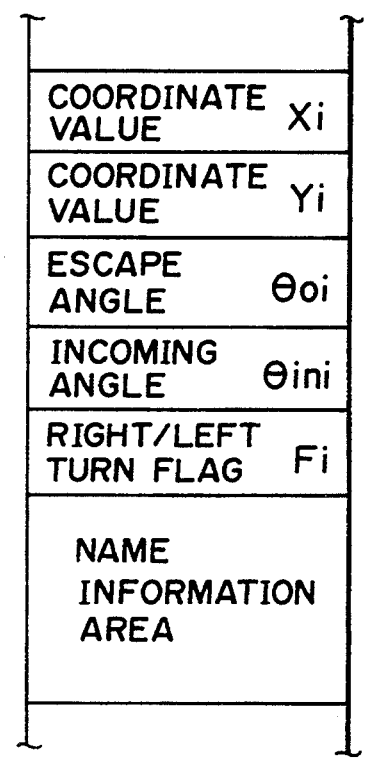

An explanatory view of the processing for generating and storing information of the traveling azimuth changed position, that the controller 47 stores as locus data, is shown in FIG. 7. FIG. 7A is a flowchart of the main processing, and FIG. 7B is a view showing data structure of one position where the traveling azimuth is changed. The controller 47 detects, as indicated by the flowchart of FIG. 7A, that the traveling azimuth is changed above a predetermined angle to judge that a vehicle curves or turns sharply to obtain various information of the position where the traveling azimuth is changed when the position where the traveling azimuth is changed is detected (step S11), thus to store them as locus data into a memory area set in the non-volatile RAM (step S12).

Information of the position where the traveling azimuth is changed is formed as shown in FIG. 7B. Namely, by coordinate values $X_i$, $Y_i$ at the traveling azimuth changed position in a displayed map, an escape angle $\theta_{0i}$ from the intersection, which is a traveling azimuth after the vehicle passes through the traveling azimuth changed position, an incoming or initial angle $\theta_{ini}$ into the intersection, etc., which is a traveling azimuth before the vehicle passes through the traveling azimuth changed position, a right/left flag Fi indicating whether the vehicle turns to the right or left with respect to the traveling direction before the vehicle passes through the traveling azimuth changed position, and information indicating the name of the traveling azimuth changed position, information of respective traveling azimuth changed position is formed to arrange such information in order of detection of traveling azimuth changed positions to store and control them as locus data.

Figure 8A:
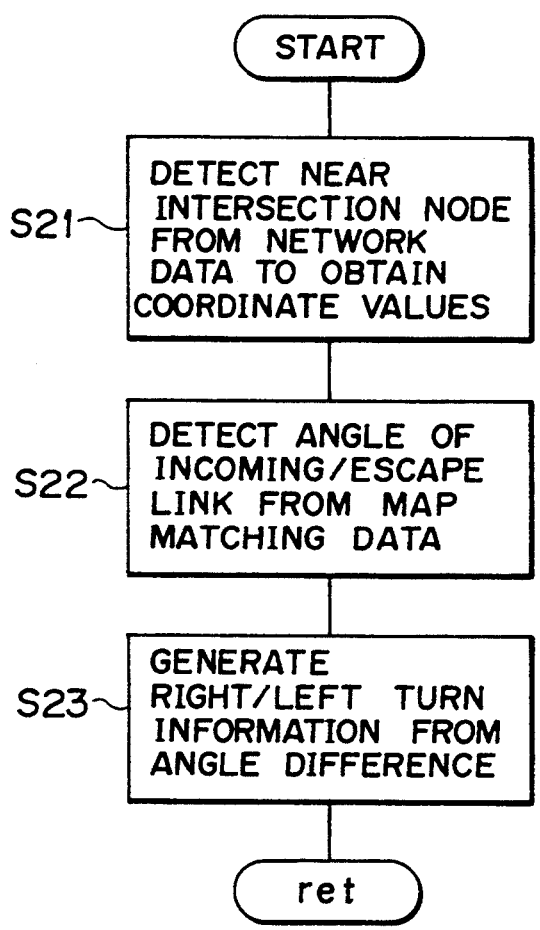
FIGS. 8A and 8B are flowcharts of the processing for generating and storing information of the traveling azimuth changed position in the second embodiment.
Figure 8B:
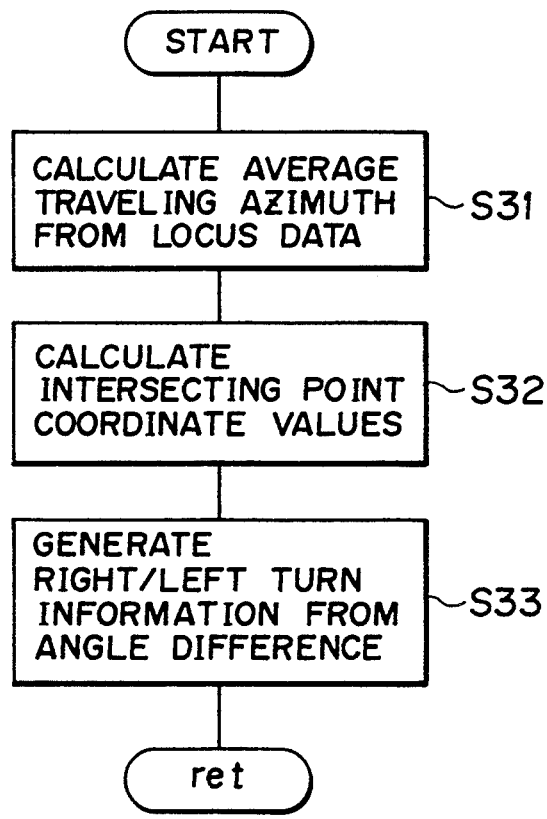

The flowchart of the detail of the processing for generating information of the position where the traveling direction is changed is shown in FIG. 8. The flowchart of the processing in the case of obtaining information relating to traveling azimuth changed positions from map information of the CD-ROM 43 is shown in FIG. 8A, and the flowchart of the processing in the case of obtaining information relating to traveling azimuth changed positions from locus data provided by storing present position data periodically generated by the position determination means is shown in FIG. 8B. Either processing shown in these two flowcharts is used according to need to obtain information of traveling azimuth changed positions.

In the processing of the flowchart shown in FIG. 8A, the controller 47 first detect, when it detects a traveling azimuth changed position, a near intersection node from network data recorded in the CD-ROM 43 to obtain coordinate values in a map displayed picture at a traveling azimuth changed position (step S21). The map information of the CD-ROM 43 is such that data are formed every display picture (map sheet). Such map sheet data are caused to be of a data structure of network together with service information, and are recorded. Each map sheet data is formed by describe data for carrying out map display except for road, and road data comprised of coordinate data for carrying out map-matching with data for describing a road on a map. More particularly, the road data includes node data indicating nodes or Junctions of roads such as the intersection, etc., and link data indicating line segments (roads) connecting between nodes. When a traveling azimuth changed position is detected, node data of an intersection nearest the detected traveling azimuth changed position is detected from node data to obtain coordinate values of that node data to store it into the memory area of the non-volatile RAM.

Then, the processing for detecting angles of incoming/escape link from the map matching data is carried out (step S22). The map matching data is data for examining whether or not there is on a road the position that present position data generated by the position determination means indicates to detect, when that position does not exist on the road, a road nearest the position that the generated present position data indicates to carry out a modifying processing such that a displayed present position is located on the detected road. In this data, angle data of roads is included. This angle data is indicated by a counterclockwise angle, e.g., with the direction of the East on a map being zero degree. An incoming road and an escaping road of the intersection are specified by locus data before and after the traveling azimuth changed position to obtain angles of incoming/escape link to store them as an escape angle and an incoming angle into the memory area of the non-volatile RAM.

Then, turning right/left information indicating that a vehicle turns to the right or turns to the left with respect to the traveling azimuth before the traveling azimuth is changed is generated from an angular difference of the incoming/escape link to set right and left flags of the memory area of the non-volatile RAM (step S23).

In the processing of the flowchart shown in FIG. 8B, the controller 47 utilizes locus data obtained by storing present position data periodically provided from the position determination means. Namely, the controller 47 calculates an average or mean traveling azimuth of locus data before it detects a traveling azimuth changed position and an average or mean traveling azimuth of locus data after it detects a traveling azimuth changed position to store them as information of an escape angle and an incoming angle into the memory area of the non-volatile RAM (Step S31).

Then, the controller 47 derives, by locus data and the calculated average traveling azimuth, a linear function of the locus before it detects a traveling azimuth changed position and a linear function of locus after it detects a traveling azimuth changed position to calculate coordinates of the intersecting points of the both straight lines to store it as information of the traveling azimuth changed position into the memory area of the non-volatile RAM (step S32 ).

Then, the controller 47 generates right/left turn information from the average traveling azimuth and an angular difference thereof to set right and left flags of the memory area (step S33).

As stated above, the controller 47 generates, when it detects a traveling azimuth changed position, coordinate values, respective angles for escape and incoming, and right/left turn information as information of the traveling azimuth changed position by either processing shown in FIG. 8, thus to store such information. Since a node of the intersection at which a vehicle curves or turns sharply, a road where the vehicle is incoming to that intersection, and a road where the vehicle escapes therefrom can be specified from network data by these locus information, it is possible to readily display a movement route.

Storage or memorization of name information is carried out as follows. Namely, when a movement route is displayed, a user designates, by means of a cursor, an intersection where the vehicle curves, for which a name display is requested thereafter input name of that intersection, thus making it possible to store name information. The controller 47 retrieves data of the designated intersection from the stored locus data to store inputted name information into that memory area. It is to be noted that there may be employed a method of storing in advance name information in relation to node data of map data to read out a corresponding intersection name when an intersection node is designated to store it into a memory.

Figure 9:
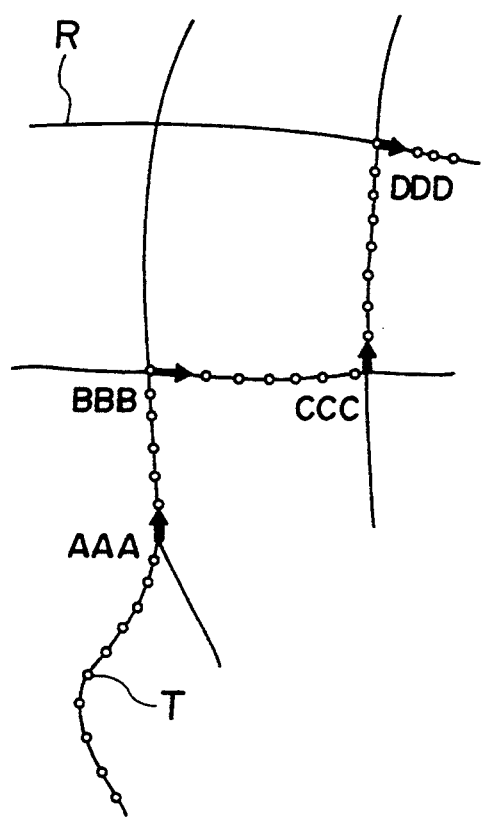
FIG. 9 is an example of display of a locus of a movement path in the second embodiment.

As stated above, in this embodiment, an approach is employed to judge whether or not a vehicle changes its traveling azimuth to store, when it is judged that the vehicle changes the traveling azimuth, coordinate values, respective angles for escaping and incoming, right-/left turn information, and name information as information of the traveling azimuth changed position. Thus, since it is unnecessary to store locus data of a road through which the vehicle has passed between intersections where the vehicle changes the traveling azimuth, it is possible to store a longer locus by the same memory capacity as in the prior art. Further, in the reference display of the movement route, for example, by information of stored traveling azimuth changed position, it is possible to easily display, as shown in FIG. 9, on a screen, marks of arrows indicating a curve direction at the intersection where the traveling azimuth is changed in the locus (marks indicated by circle) T of a route in which the vehicle moves on a road R, names (AAA, BBB, CCC, DDD) of those intersections, or the like. Accordingly, when reproductive display is carried out, it is possible to clearly confirm from a visual point of view where and how the vehicle curves or turns sharply. Thus, burden on a driver can be lessened in running on the same route.

It is to be noted that while, in the above described embodiment, azimuth is detected by a geomagnetic sensor as the azimuth detection means, a traveling azimuth may be detected in accordance with a change of present position data generated by the GPS receiver as the position determination means.

Further, while every time a traveling azimuth changed position is detected, information of that changed position is generated, this invention is not limited to such implementation. For example, an approach may be employed to store locus data and traveling azimuth changed positions until the quantity of data reaches a memory capacity of the ring buffer to collectively generate information of respective traveling azimuth changed positions at the time when the quantity of data fully reaches the memory capacity of the ring buffer. In addition, compression processing may be carried out at the time when locus data is transferred to another media, or after it is transferred thereto.

A third embodiment will now be described.

THIRD EMBODIMENT

Figure 10:
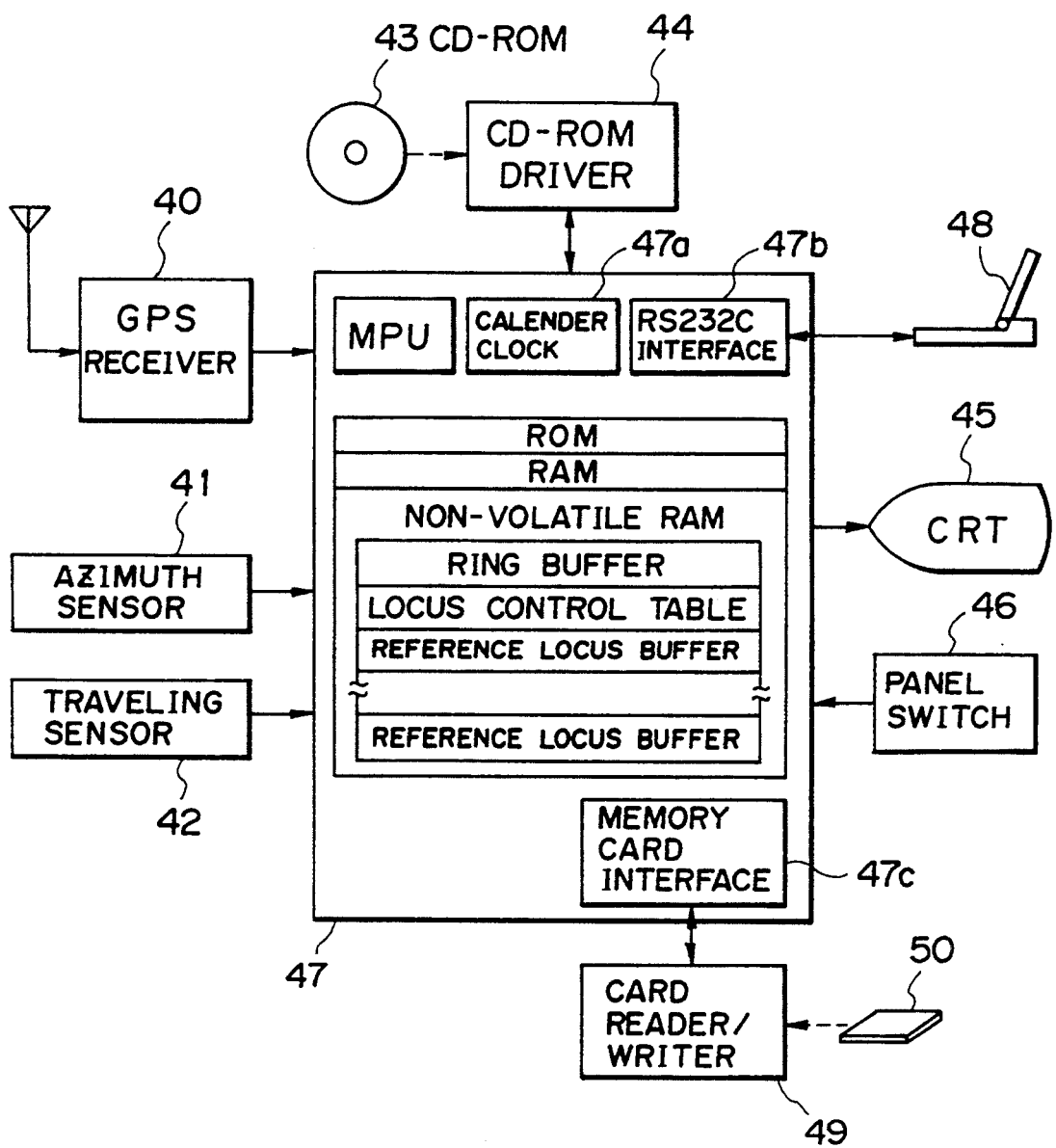
FIG. 10 is a block diagram showing a navigation system adapted to be mounted in a vehicle, which is a third embodiment of the present invention.

The configuration of a navigation system adapted to be mounted in a vehicle which is an embodiment of the third invention is shown in FIG. 10. The configuration of the navigation system shown in this figure is substantially the same as the configuration of the first embodiment. Accordingly, the same reference numerals are respectively attached to the same components, and their explanation will be omitted. The configuration of the navigation system of the third embodiment differs from the configuration of the first embodiment shown in FIG. 4 in that the internal configuration of the controller 47 is modified, that a personal computer 48 of the wrap top type is connectable as the locus storage means, and that there is provided a card reader/writer 49 for carrying out a write/read operation of data into and from an IC memory card 50.

The controller 47 is constructed, similarly to the configuration of the first embodiment, of a MPU for carrying out data processing and other various controls, a ROM and a RAM for storing programs of the MPU and other data, and a battery backed up non-volatile RAM. In this embodiment, the navigation system further includes a calendar clock 47a serving as clocking means for generating data of year/month/day/time, a RS232C interface 47b serving as means for carrying out data communication with an external device such as a personal computer, etc., a memory card interface 47c, and various interfaces (not shown). In this configuration, the non-volatile RAM is utilized in such a form that a ring buffer for storing locus data to be collected, a plurality of reference locus data buffers for storing reference locus data as locus storage means, and an area of a locus control table for controlling the reference locus buffer are set.

In the above-mentioned configuration, when the switch is turned ON, the controller 47 obtains, as the present position display means, present position data by the GPS receiver 40 or the azimuth sensor 41 and running sensor 42 to read out map information corresponding to that present position from CD-ROM 43 through CD-ROM driver 44 to display the map information thus read out and a mark indicating the present position on CRT 45. Further, the controller 47 periodically obtains present position data to carry out updating relating to display of the present position mark followed by movement of the position of a vehicle in which this navigation system is mounted and a present place map. Furthermore, the controller 47 responds to an input instruction from the panel switch 46 to read out various information except for map from the CD-ROM 43 or ROM to display them on the CRT 45. In addition, the controller 47 carries out processing relating to locus, as the locus data memory means, the locus display means, the locus control means, and the locus storage means. The processing relating to locus will now be described below.

In the processing as the locus data memory means, the controller 47 obtains, similarly to the prior art, present position data from the position determination means every a fixed time or every a fixed distance at the time of running to store it as locus data into the ring buffer. Such locus data are collected and stored after undergoing data compression as in the first embodiment, or as information of featuring points such as coordinate values in a map at the traveling azimuth changed position of the intersection where a vehicle curves, etc. or traveling azimuth values before and after that traveling azimuth changed point as in the second embodiment. Thus, locus data of a long distance is stored. The locus data stored in the ring buffer is utilized in the processing as the locus display means in the same manner as in the prior art. Namely, in the processing as the locus display means, not only a present position but also a locus of the transit route immediately before that time are displayed on a screen by locus data stored in the ring buffer. In this embodiment, there is employed a distinctive display system such that the locus display when displaying a present invention is called an "ordinary display", and the locus display which is not related to the present position is called a "reference display". In the processing as the locus display means, the controller 47 controls the locus display pointer with respect to the buffer memory for storing locus data to display loci of "ordinary display" and "reference display" by locus data that the locus display pointer indicates.

The processing as the locus control means will now be described below.

The flowchart of the processing in the case where the controller 47 operates as the locus control means is shown in FIG. 11. Various processing of locus are started by an instruction input from the panel switch 46. As shown in the above flowchart, when an instruction input of the locus processing is given, the controller 47 carries out a display of menu to hasten a user to select a desired one of respective processing (step S40). The controller 47 examines an input after such a menu is displayed to respond to the inputted instruction to carry out one of a switching processing from the reference display to the ordinary display (step S41), a reference display processing of locus (step S42), an internal storage processing of locus data (step S43), a processing for erasing locus data (steps S44, 45), and a place name editing processing of reference local (step S46). In addition, the controller 47 carries out an external storage processing of locus data through the RS232C interface 47b and the memory card interface 47c, and an inputting processing of reference locus data through those interfaces.

The processing for erasing locus data will be first described. As shown in FIG. 11, when an instruction input for erasing processing is given, the controller 47 carries out a processing to erase data stored in the ring buffer, a processing to set a locus data collection start flag, and to initialize a start pointer and a present position pointer of the ring buffer (step S44). Then, the controller 47 obtains present position data to store it in the first area of the ring buffer with a present position at that time as a collection start point, and obtains place name data as information of that start point to determine the name of that start point to set it in a predetermined memory area (step S45). A method of obtaining place name data will be described later. The controller 47 starts collection of locus data from a new present position by the above-mentioned erasing processing to store in sequence locus data generated followed by running of the vehicle into the ring buffer.

Figure 12A:
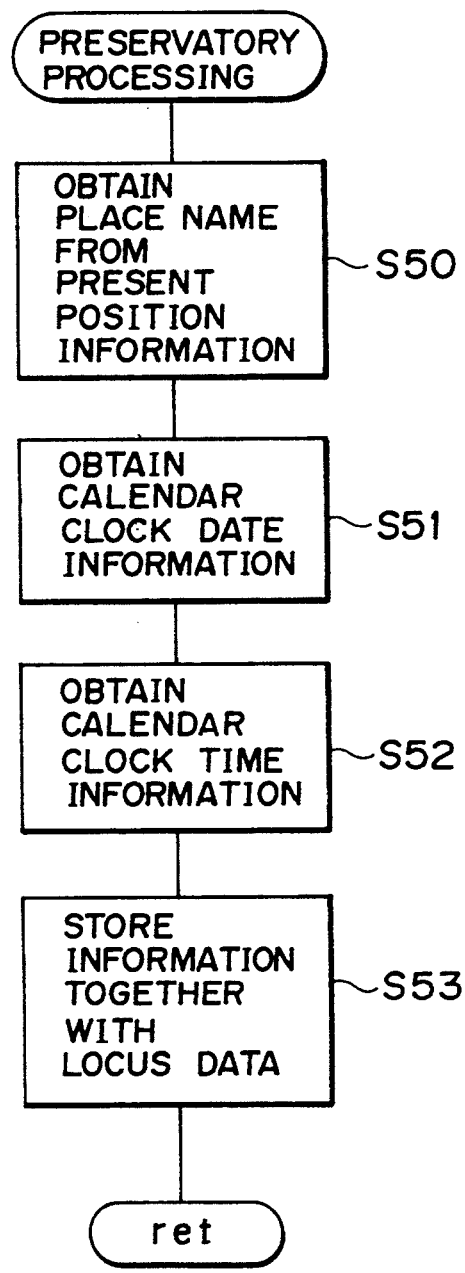
FIGS. 12A and 12B are views showing the flowchart of the locus storing or preserving processing and the structure of stored or preserved data in the third embodiment.
Figure 12B:
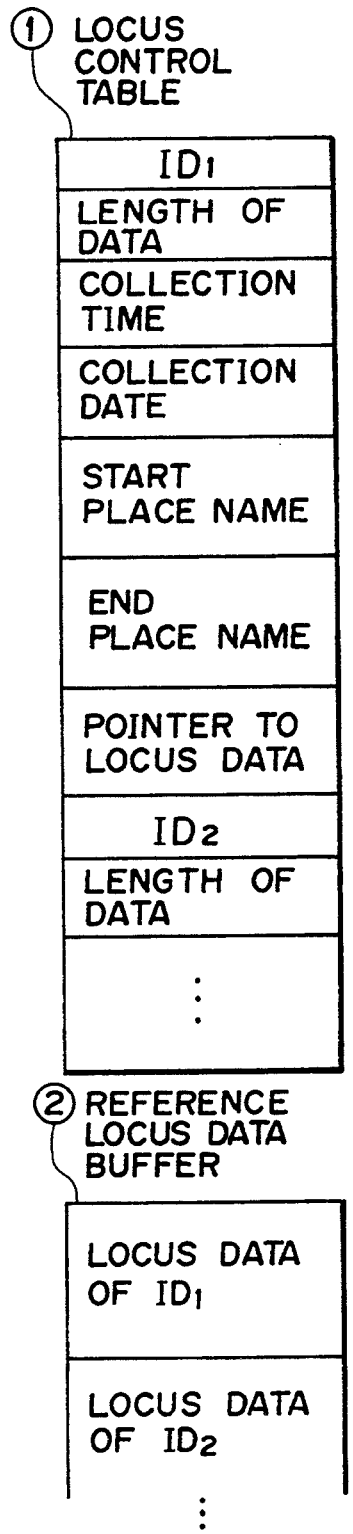

Then, the processing for internally storing or preserving locus data will now be described. The flowchart of the processing for internally storing or preserving locus data is shown in FIG. 12A. As shown in this flowchart, the controller 47 obtains, when an instruction input of the processing for internally storing or preserving locus data is given, place name data at the collection end point as information at the collection end point with a present position at that time as the collection end point to assume it as a name of that point (step S50). Further, the controller 47 obtains date information and time information from the calendar clock 47a (steps S51, 52). Then, the controller 47 stores or preserves such information as collection zone information of locus data into a predetermined area of the reference locus buffer, and transfers locus data stored in the ring buffer to a predetermined area of the reference locus buffer to store or preserve it (step S53). Then, the controller 47 records control information such as control No., or storage place, etc. of the stored or preserved reference locus data into the locus control table. The locus data stored or preserved in the reference local buffer includes, as shown in FIG. 12B, a locus control table 1 and a reference locus data buffer 2. In the locus control table 1, ID indicating memory No., length of locus data (data quantity), collection time and collection date, collection zone information including start place name and end place name, and address pointer of the locus data stored in the reference locus data buffer 2 are stored every collection zone. In addition, reference locus data is stored every collection zone in the reference local data buffer 2.

Figure 13A:
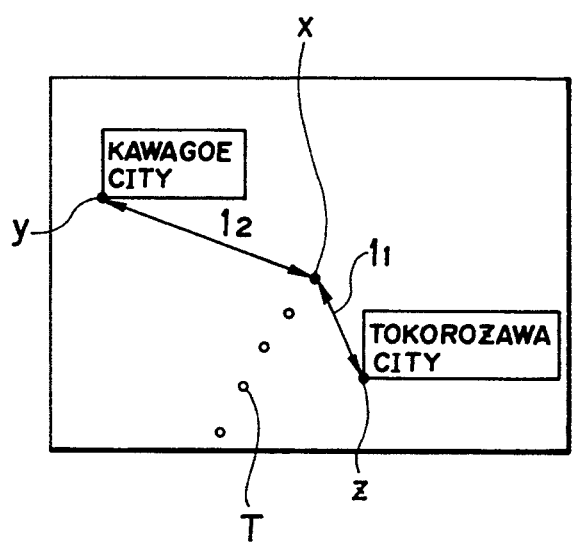
FIGS. 13A and 13B are explanatory views of acquisition of names at divisional points of locus data collection in the third embodiment.
Figure 13B:
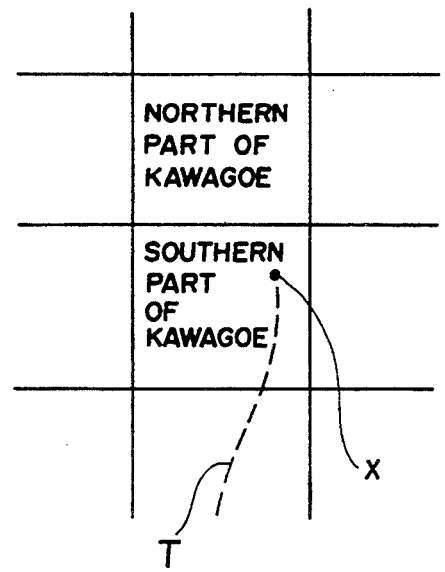

The method of obtaining the start place name and the end place name described above will now be described. As place name data obtained, names of cities, wards or districts, towns, villages or names of map sheets in map information recorded in the CD-ROM 43 are utilized. An explanatory view of the method of utilizing names of cities, wards or districts, towns, villages is shown in FIG. 13A. An explanatory view of the method of utilizing name of map sheets is shown in FIG. 13B. In the case of utilizing names of cities, wards or districts, towns, villages, with respect to, e.g., end place name, as shown in FIG. 13A, an approach is employed to obtain coordinates in a displayed map of the data collection end point (x) of a locus T to calculate a distance ($l_1$, $l_2$) between the coordinate values of the collection end point (x) and displayed position coordinates y, z of respective names of cities, wards or districts, towns, villages indicated in the map to select a name of city, ward or district, town or village nearest the collection end point (x) (Tokorozawa City in the example of the figure). Further, map information recorded in the CD-ROM 43 is such that data are formed every displayed picture (map sheet), and map sheet names (the northern part of Kawagoe, the southern part of Kawagoe in the example shown in FIG. 13B) are attached to respective display pictures. In the case of utilizing the map sheet name, for example, with respect to the end place name, as shown in FIG. 13B, the map sheet name (the northern part of kawagoe in the example shown) of the display picture of the data collection end point (x) of the locus T is selected.

The locus reference display processing will now be described below.

Figures 14A, 14B:
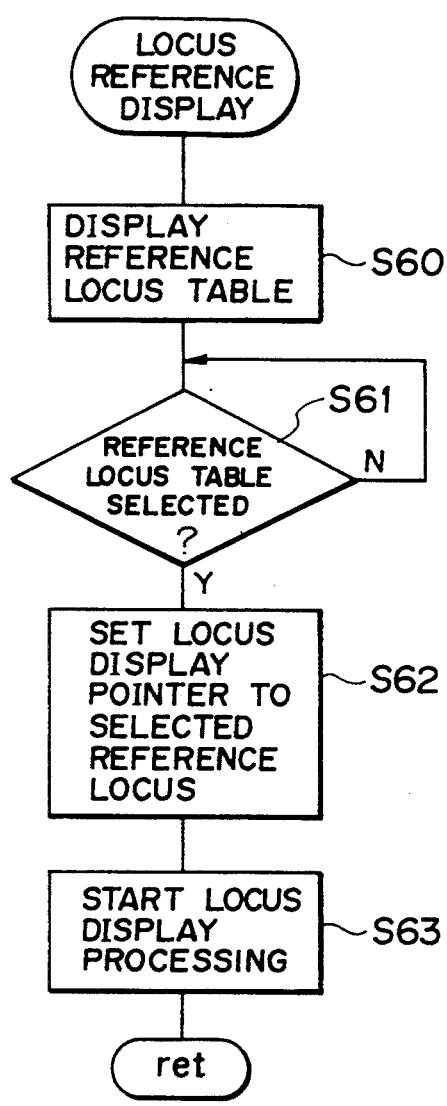
FIGS. 14A and 14B are flowcharts of the locus reference display processing and an example of display of a reference locus table in the third embodiment.

The flowchart of the locus reference display processing is shown in FIG. 14A. As shown in this flowchart, the controller 47 displays, when an instruction of reference display is given, a list or table of reference locus data stored by control data stored in the locus control table to hasten a user to select a desired locus (step S60). As an example of display, a list or table of reference locus data is shown in FIG. 14B. Then, the controller 47 obtains, when an instruction input to select a locus subjected to reference display is given, an address of the reference locus buffer in which the selected locus is stored or preserved from the locus control table to set the locus display pointer (steps S61, 62). Then, the controller 47 starts the processing as the locus display means (step S63). Thus, the controller starts the processing as the locus display means to display a map at the start point of the reference locus, and to display a locus from the start point. Further, the controller 47 responds to an instruction input to update display of the map and the locus. In order to return from the state of the reference display to the state of the ordinary display, when a procedure is taken as shown in FIG. 11 to display a menu to select the ordinary display to carry out an instruction input, the locus display pointer is set to the present position point of the ring buffer (step S41). Thus, the ordinary display results.

The place name editing processing will now be described.

The flowchart of the place name editing processing is shown in FIG. 15. As shown in this flowchart, the controller 47 displays, when an instruction input of the place name editing is given, a list or table of the stored reference locus data is displayed by control data stored in the locus control table to hasten a user to select a place name to be altered from a start place name and an end place name of the displayed reference locus (steps S70, 71). The controller 47 obtains, when a selection input of a place name to be altered is given, a memory address of the selected place name in the reference locus buffer to which the selected place name belongs to store it (step S72). Then, the controller 47 hastens user to input an altered or changed place name to control inputting of place names (step S73). Then, the controller 47 stores, when the altered or changed place name is inputted, the inputted place name into a memory area designated by the memory address of the selected place name to rewrite the content thereof (step S74). Thus, alteration of one place name is completed.

The storing or preserving processing to the external of locus data and the inputting processing from the external thereof will now be described with reference to FIG. 10.

The storing or preserving processing to the external of locus data and the inputting processing from the external thereof are started when an instruction is inputted from the personal computer 48 in the case where the navigation system body, i.e., the controller 47 and an external device, e.g., the personal computer 48 are connected through RS232 interface 47b. Namely, when a storage command to the external of locus data is inputted through the RS232C interface 47b, the controller 47 outputs in sequence data stored in the reference locus buffer together with control data through the RS232C interface 47b. The personal computer 48 is adapted to serve as an external storage device to store inputted locus data into a magnetic disk or an optical disk, etc. Further, when an input command of locus data is given from the personal computer 48, the controller 47 inputs reference locus data through the RS232C interface 47b to store it into a predetermined reference locus buffer every reference locus data of one zone.

Preservation or storage of locus data into an IC memory card will now be described. The card reader/writer 49 outputs, when an IC memory card is inserted, control information of locus data stored in that card to the controller 47. The controller 47 stores the inputted control information to control locus data preserved or stored by that information. When a storage or preservation command is inputted from the panel switch 46, the controller 47 designates, if there is an unoccupied or empty area, that area by the control information to output the designated locus data together with control data to the card reader/writer 49. Thus, newly preserved or stored locus data is added to the control information. When a readout command is inputted, the controller displays a list of locus data preserved or stored by control information to subsequently designate the locus data instructed and inputted from the panel switch 46 to read out it by means of the card reader/writer 49 to store it into a predetermined reference locus buffer to carry out display of locus.

As stated above, in the navigation system of this embodiment, when an instruction of preservation or storage is given, locus data collected at the time of running is preserved or stored as reference locus data. On the other hand, when an instruction of reference display is given, the instructed reference locus data is displayed. Thus, for example, in such cases that one frequently goes to a new destination by car, it is possible to repeatedly reference to a locus with ease when one went for the first time until he or she is familiar with its route. This assists him or her in quickly learning that route. Further, even in the case of a designation such that one occasionally goes, an approach can be employed to preserve or store a locus when one went once into a personal computer of the wrap top type, or the like to input locus data from the personal computer when one is going to that place for a second time to display a movement route when one went last time to reference to that display. For this reason, this navigation system greatly advantageously contributes to support of driving up to a destination. Further, since locus data is preserved or stored into the IC memory card, it is possible to readily bring preserved or stored data into a vehicle, and to easily reference to locus data preserved or stored when other automotive vehicles run. For this reason, this navigation system permits support of driving to be more effectively conducted.

It is to be noted that there may be employed in the above-described embodiment a configuration to output locus data from the ring buffer directly to the external to preserve or store it without providing a reference memory buffer in the navigation system.

What is claimed is:

1. A navigation system comprising:
map information memory means for storing map information to be displayed;
position determination means for determining a present position of a moving body in which the navigation system is mounted to generate present position data;
azimuth detection means for detecting a traveling azimuth of the moving body;
locus data memory means for storing, as locus data which indicate a locus where said moving body has travelled in the past, the present position data at fixed periods or every movement of a fixed distance;
azimuth change detection means adapted for monitoring a traveling azimuth detected by said azimuth detection means to judge a change in the traveling azimuth, and detecting as an azimuth changed position, the present position data when the traveling azimuth is changed;
locus data compression means for compressing the locus data stored in said locus data memory means by selecting and leaving only locus data inside a predetermined range before and after the azimuth changed position and by erasing locus data outside said predetermined range; and
display means adapted to obtain map information corresponding to the present position data from said map information memory means to display that map information and a present position, and to display the locus in the displayed map information by specifying a travel path to the azimuth changed position and a travel path from the azimuth changed position in the displayed map information according to the azimuth changed position and the travelling azimuth reproduced from the locus data stored in said locus data memory means.

2. A navigation system as set forth in claim 1, wherein said map information memory means comprises a compact disk.

3. A navigation system as set forth in claim 1, wherein said position determination means comprises a GPS receiver.

4. A navigation system as set forth in claim 1, wherein said azimuth detection means comprises an azimuth sensor.

5. A navigation system comprising:

map information memory means for storing map information to be displayed;

position determination means for determining a present position of a moving body in which the navigation system is mounted to generate present position data;

azimuth detection means for detecting a traveling azimuth of the moving body;

azimuth change detection means adapted for monitoring a traveling azimuth detected by said azimuth detection means to judge a change in the traveling azimuth, and detecting, as an azimuth changed position, the present position data when the traveling azimuth is changed;

azimuth changed information memory means for obtaining the traveling azimuth and the azimuth changed position to generate data of coordinate values in a map display picture at the azimuth changed position and data of at least one of traveling azimuths before and after the moving body passes through the azimuth changed position and storing them as locus data which indicate a locus where said moving body has travelled in the past only as for azimuth changed positions, while the generated present position data and the detected travelling azimuth are not recorded as for positions other than the azimuth changed position; and display means adapted to obtain map information corresponding to the present position data from said map information memory means to display that map information and a present position, and to display the locus in the displayed map information by specifying a travel path to the azimuth changed position and a travel path from the azimuth changed position in the displayed map information according to the azimuth changed position and the travelling azimuth reproduced from the locus data stored in said azimuth changed information memory means.

6. A navigation system as set forth in claim 5, wherein said display means displays, in displaying the locus in the map information, a mark indicating an azimuth changed point at a coordinate position in the map at the azimuth changed position.

7. A navigation system comprising:

map information memory means for storing map information to be displayed;

position determination means for determining a present position of a moving body in which the navigation system is mounted to generate present position data;

locus data memory means for collecting and storing, as locus data which indicate a locus where said moving body has travelled in the past, the present position data at fixed periods, or every movement of a fixed distance;

locus storage means for storing the collected locus data in a zone sectioned by a collection start point and a collection end point of the locus data with respect to a single zone or a plurality of zones;

locus control means, which is operated according to an instruction from the external, for storing, into said locus storage means, locus data inside the collection zone collected in said locus data memory means together with information of the collection zone including the collection start point and the collection end point of that locus data, for erasing locus data outside the collection zone from said locus data memory means and for controlling the stored locus data; and display means adapted to obtain map information corresponding to the present position data from said map information memory means to display that map information and a present position, and to select locus data in a zone instructed by said locus control means out of the locus data stored in said locus data memory means or said locus storage means, thus to display the locus corresponding to the selected locus data in the displayed map information.

8. A navigation system as set forth in claim 7, wherein said locus storage means comprises an external memory unit which can externally store data.

9. A navigation system as set forth in claim 8, wherein said external memory unit comprises an IC card.

10. A navigation system as set forth in claim 7, further comprising:

azimuth detection means for detecting a traveling azimuth of the moving body;

azimuth change detection means adapted for monitoring a traveling azimuth detected by said azimuth detection means to judge a change in the traveling azimuth, and detecting, as an azimuth changed position, the present position data when the traveling azimuth is changed; and locus data compression means for compressing the locus data stored in said locus data memory means by selecting and leaving only locus data in a predetermined range before and after the azimuth changed position.

11. A navigation system comprising:

map information memory means for storing map information to be displayed;

position determination means for determining a present position of a moving body in which said navigation system is mounted to generate present position data;

azimuth detection means for detecting a traveling azimuth of the moving body;

azimuth change detection means adapted for monitoring a traveling azimuth detected by said azimuth detection means to judge a change in the traveling azimuth, and detecting, as an azimuth changed position, the present position data when the traveling azimuth is changed;

azimuth changed information memory means for obtaining the traveling azimuth and the azimuth changed position to generate data of coordinate values in a map display picture at the azimuth change position and data of at least one of traveling azimuths before and after the moving body passes through the azimuth changed position and storing them as locus data which indicate a locus where said moving body has travelled in the past only as for azimuth changed position, while the generated present position data and the detected travelling azimuth are not recorded as for positions other than the azimuth changed positions; and locus storage means for storing the collected locus data in a zone sectioned by a collection start point and a collection end point of the locus data with respect to a single zone or a plurality of zones;

locus control means, which is operated according to an instruction from the external, for storing, into said locus storage means, locus data collected and stored in said azimuth changed information memory means together with information of the collection zone including the collection start point and the collection end point of that locus data, for erasing locus data outside the collection zone from said locus data memory means and for controlling the stored locus data; and display means adapted to obtain map information corresponding to the present position data from said map information memory means to display that map information and a present position, and to select locus data in a zone instructed by said locus control means out of the locus data stored in said azimuth changed information memory means or said locus storage means, thus to display the locus corresponding to the selected locus data in the displayed map information.

* * * * *